US005180174A

United States Patent [19]

Province

[11] Patent Number: 5,180,174

[45] Date of Patent: Jan. 19, 1993

[54] POTTER'S WHEELHEAD ASSEMBLY WITH RELOCATABLE AXIS OF ROTATION

[76] Inventor: Clarence T. Province, 5978 Hill St., Berrien Springs, Mich. 49103

[21] Appl. No.: 722,006

[22] Filed: Jun. 27, 1991

[51] Int. Cl.[5] ........................ B28B 17/00; B23B 31/36

[52] U.S. Cl. ........................................ 279/6; 279/133; 279/158; 425/263; 425/459

[58] Field of Search ........................... 279/6, 158, 133; 425/263, 459; 82/165, 170

[56] References Cited

U.S. PATENT DOCUMENTS

| | | | |
|---|---|---|---|
| 1,377,785 | 5/1921 | Odelberg | 425/459 |
| 3,451,359 | 6/1969 | Glasgow | 107/47 |
| 4,057,384 | 11/1977 | Reid | 425/459 |
| 4,222,577 | 9/1980 | Giffin | 279/114 |
| 4,585,240 | 4/1986 | Giffin | 279/111 |

FOREIGN PATENT DOCUMENTS

| | | | |
|---|---|---|---|
| 924498 | 3/1955 | Fed. Rep. of Germany | 425/263 |

*Primary Examiner*—Steven C. Bishop

*Attorney, Agent, or Firm*—John R. Flanagan

[57] ABSTRACT

A wheelhead assembly for use upon a vertical rotary power drive shaft of a potter's wheel includes a top plate, a drive shaft coupler, and a locking arrangement for releasably securing and adjustably relocating the top plate relative to the drive shaft coupler. The top plate has a planar upper surface for supporting a mass of clay to be molded into a composite article of pottery. The drive shaft coupler has a fixed axis of rotation and is capable of supporting the top plate upon the rotary drive shaft of the potter's wheel for rotation with the coupler about its axis of rotation. The locking arrangement is disposed along the underside of the top plate and is capable of releasably securing the top plate to the drive shaft coupler and of adjustably relocating the top plate relative to the ddrive shaft coupler to a selected one of a multitude of different position along orthogonal X-Y coordinates defined by the locking arrangement to thereby relocate the axis of rotation of the drive shaft coupler relative to the top plate to the selected position along the orthogonal X-Y coordinates.

11 Claims, 2 Drawing Sheets

POTTER'S WHEELHEAD ASSEMBLY WITH RELOCATABLE AXIS OF ROTATION

BACKGROUND OF THE INVENTION

1. Field of the Invention

The present invention generally relates to equipment for making pottery and, more particularly, is concerned with a potter s wheelhead assembly having a relocatable axis of rotation.

2. Description of the Prior Art

An apparatus for making articles of pottery referred to as a potter's wheel is widely used by hobbyists, craftsmen and artisans. The potter's wheel typically employs a circular wheelhead having a planar upper surface. The wheelhead is centrally mounted upon and rotatably driven by a vertical rotary power drive shaft. The wheelhead is rotated, either manually or with a motor-driven system, about a central axis of rotation which is coaxial with the vertical rotary drive shaft.

A mass of wet clay deposited on the planar upper surface of the wheelhead at the location of its axis of rotation is shaped or "thrown" by manually manipulating the clay as the potter's wheelhead rotates. Single articles such as a vase, bowl, plate, or candle holder are typically made from the mass of wet clay using the potter's wheel.

Frequently, it is desirable to be able to form composite articles composed, for example, of different arrangements of these single articles together. One example of such a composite article is a platter having several candle holders mounted on it. Heretofore, only one of the candle holders could be integrally formed at a central location on the platter. The other candle holders had to be formed separate from the platter using a separate mass of clay. These latter candle holders would then be placed in the desired arrangement on the platter offset from the central candle holder and attached to the platter in some manner.

A shortcoming of this procedure of fabricating a composite article is that it typically leaves weakened joints between the separately-formed non-integral candle holders and the platter. The formation of an integral connection of each candle holder with the platter has not been possible up to the present time due to an inherent limitation in the capability of prior art potter's wheels. This limitation is that prior art wheelheads have a single fixed central axis of rotation. Thus, the article to be shaped from the mass of clay must always be positioned on the wheelhead at the central location of the rotational axis of the wheelhead. In the example of a platter with three candle holders on it, since the prior art wheelheads have only a single fixed axis of rotation only one of the three candle holders can be placed at the center of the platter.

Consequently, a need exists for improvement in potter's wheelhead construction which will overcome the inherent shortcoming found present in the prior art wheelheads.

SUMMARY OF THE INVENTION

The present invention provides a potter's wheelhead assembly designed to satisfy the aforementioned needs. The wheelhead assembly of the present invention employs a combination of components being movably adjustable relative to one another so as to permit relocation of the axis of rotation of the assembly to any one of a multitude of different positions within the perimeter of the assembly. At each position to which the axis of rotation of the assembly is adjustably relocated, another article of pottery can be integrally shaped from the original mass of clay deposited on the wheelhead assembly such that a composite article of pottery can now be fabricated with single articles making up the composite article being integrally connected together.

Accordingly, the present invention is directed to a wheelhead assembly for use upon a vertical rotary power drive shaft of a potter's wheel. The wheelhead assembly comprises: (a) means defining a upper surface for mounting a mass of clay to be molded into an article of pottery; (b) a drive shaft coupler having a fixed axis of rotation and being capable of supporting the upper surface defining means upon the rotary drive shaft of the potter's wheel for rotation with the coupler about the axis of rotation; and (c) means for releasably securing the upper surface defining means to the drive shaft coupler and for adjustably relocating the upper surface defining means relative to the drive shaft coupler to a selected one of a multitude of different positions along orthogonal X-Y coordinates defined by the securing and relocating means to thereby relocate the axis of rotation of the drive shaft coupler relative to the upper surface defining means to the selected one position along the orthogonal X-Y coordinates.

More particularly, the drive shaft coupler is composed of an upper mounting base supporting the upper surface defining means and a hollow coupling sleeve attached to the base and extending downwardly therefrom and capable of insertion over and releasable attachment to an upper end of the drive shaft of the potter's wheel. Further, the upper surface defining means is a top plate and the securing and relocating means includes a bottom plate having a central opening and being attached and disposed adjacent to the top plate.

Also, the securing and relocating means includes a plurality of guide channels formed in the bottom plate so as to extend radially outwardly from the central opening of the bottom plate and define the orthogonal X-Y coordinates. Further, the securing and relocating means includes a plurality of elongated locating members and means for disposing and locking the locating members at selected positions along the respective guide channels. The locating members are mounted in the radial guide channels of the bottom plate for slidable movement toward and away from the central opening and engageable with the drive shaft coupler at angularly displaced locations about the coupler. When the locating members are secured by the releasable locking means at the selected positions along the respective guide channels, the top plate is secured to the drive shaft coupler and thereby the top plate is secured at a selected one position relative to the axis of rotation of the drive shaft coupler.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 4 is an enlarged bottom plan view of the drive shaft coupler of the wheelhead assembly.

FIG. 5 is a side elevational view of the drive shaft coupler as seen along line 5—5 of FIG. 4.

FIG. 6 is a perspective view of a composite article of pottery resting on the wheelhead assembly being composed of a platter and three candle holders integrally formed thereon.

DETAILED DESCRIPTION OF THE INVENTION

Figure 1:
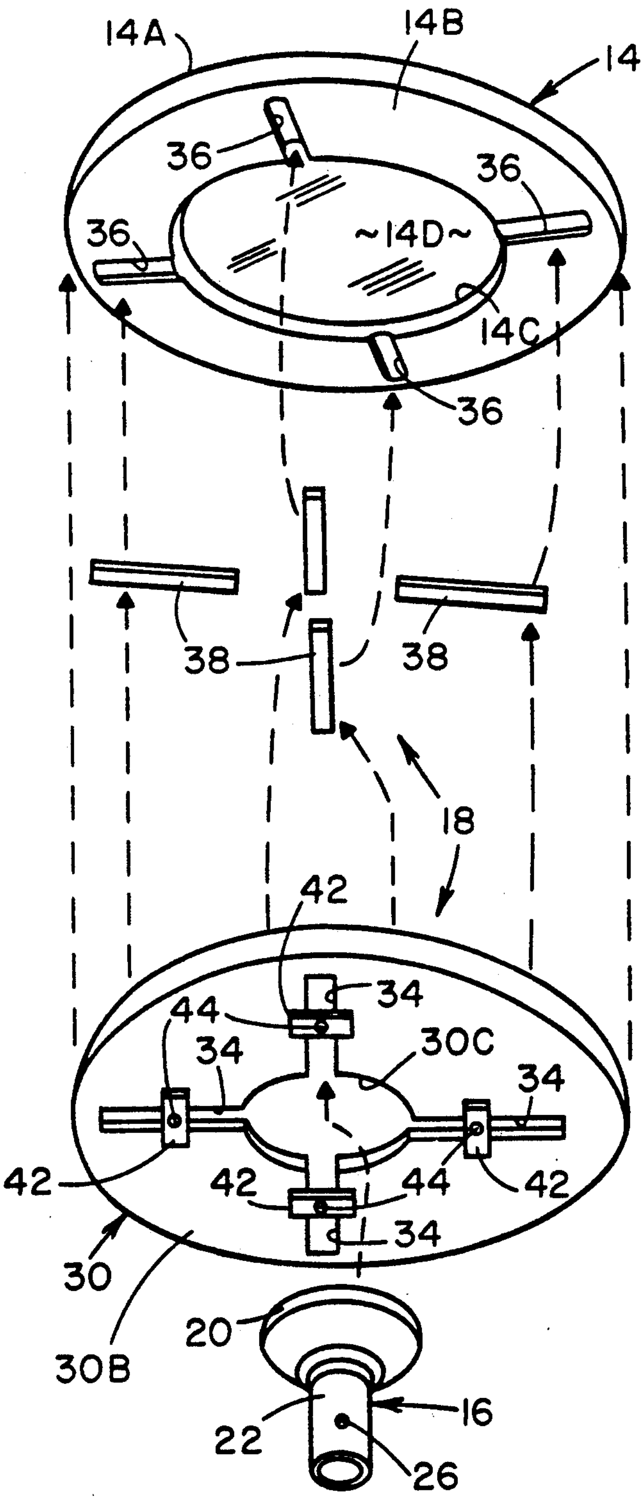
FIG. 1 is an exploded perspective view of a potter's wheelhead assembly of the present invention.

In the following description, like reference characters designate like or corresponding parts throughout the several views of the drawings. Also in the following description, it is to be understood that such terms as "top", "bottom", "front", "rear" and the like, are words of convenience and are not to be construed as limiting terms.

Figure 2:
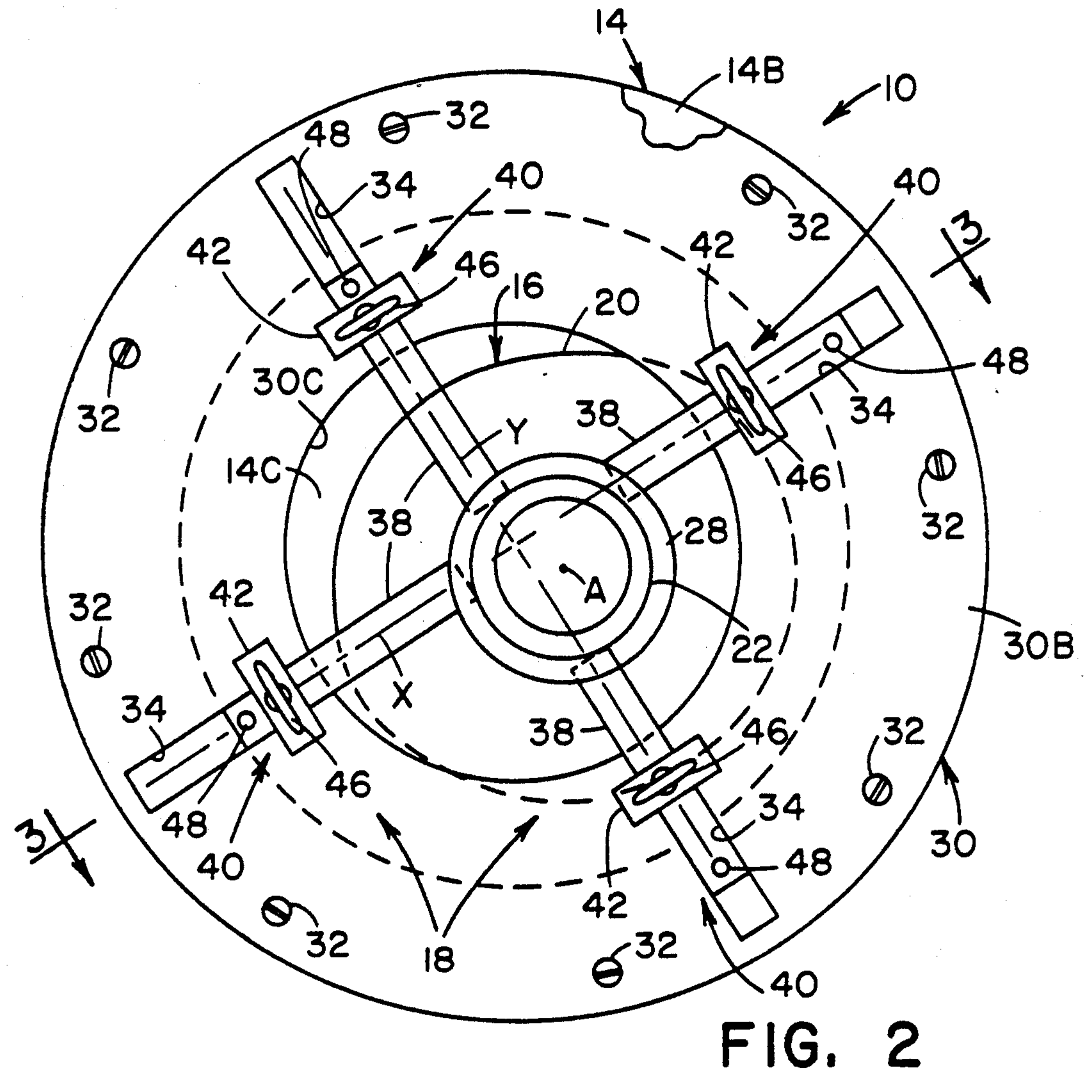
FIG. 2 is an enlarged assembled bottom plan view of the wheelhead assembly.
Figure 3:
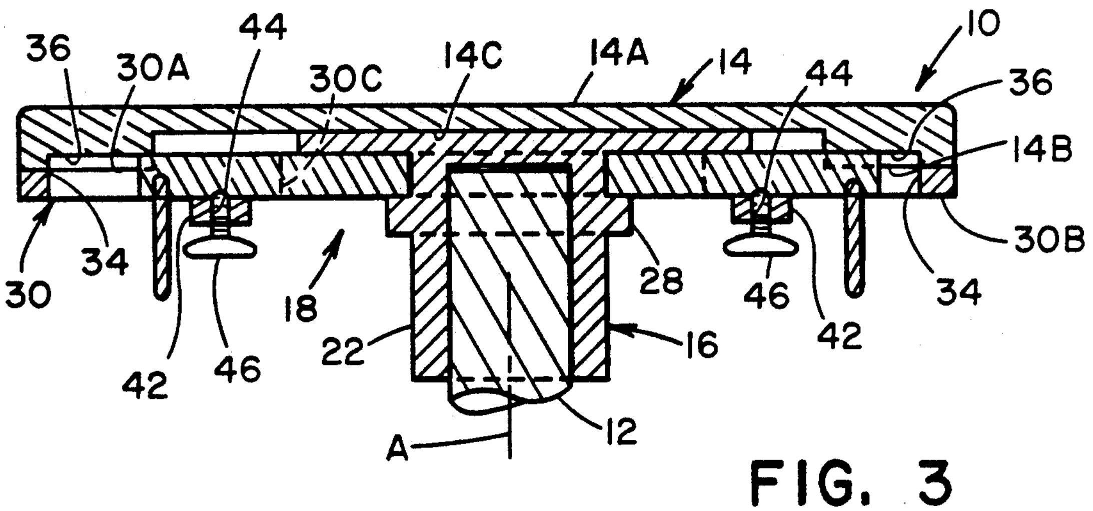
FIG. 3 is a cross-sectional view of the wheelhead assembly taken along line 3—3 of FIG. 2.

Referring to the drawings, and particularly to FIGS. 1-3, there is illustrated a wheelhead assembly, generally designated 10, for use upon a vertical rotary power drive shaft 12 of a potter's wheel in forming a composite article of pottery P (see FIG. 6) in accordance with the principles of the present invention. In its basic components, the potter's wheelhead assembly 10 includes a top plate 14, a drive shaft coupler 16 capable of supporting the top plate 14 upon the vertical drive shaft 12 of the potter's wheel, and means in the form of a locking arrangement 18 for releasably securing the top plate 14 to the drive shaft coupler 16. The components making up the locking arrangement 18, which will be described in detail below, are also capable of adjustment relative to one another to permit relocation of the top plate 14 relative to the drive shaft coupler 16 to a selected one of a multitude of different positions along the orthogonal X-Y coordinates defined by the locking arrangement 18.

Referring still to FIGS. 1—3, the top plate 14 of the wheelhead assembly 10 is referably of circular shape and has a substantially planar upper surface 14A, as seen in FIG. 6, for supporting a mass of clay to be molded into the composite article of pottery P. The top plate 14 also has a substantially planar lower peripheral surface portion 14B with a centrally-located circular bottom cavity 14C recessed therein. The top plate 14 also has a substantially planar lower central surface portion 14D spaced above the lower peripheral surface portion 14B and forming the top of the bottom cavity 14C.

Referring to FIGS. 1-5, the drive shaft coupler 16 of the wheelhead assembly 10 is composed of an upper circular mounting base 20 and a lower cylindrical hollow coupling sleeve 22 centrally attached to the bottom of the base 20 and extending below the base. The drive shaft coupler 16 is installed by sliding its lower coupling sleeve 22 down over the upper end of the vertical drive shaft 12 of the potter's wheel. Then, the coupler 16 is secured to the shaft 12 by tightening a set screw 24, threaded into a hole 26 in the side of the sleeve 22, against the shaft 12. Top plate 14 is placed over and in resting relation upon the mounting base 20 of the coupler 16 with the base 20 disposed in the cavity 14C of the top plate 14. The diameter of the circular cavity 14C is substantially larger than that of the circular mounting base 20 for permitting to the top plate 14 to be placed at a selected one of a multitude of different positions on the base 20 within the perimeter of the circular cavity 14C. The coupler 16 also has an annular collar 28 attached about the upper end of the coupling sleeve 22 of the coupler 16 adjacent to and in spaced relation below the top base 20 of the coupler.

Further, the drive shaft coupler 16 has a fixed axis of rotation A that is defined by the longitudinal axis of its cylindrical coupling sleeve 22. When the drive shaft coupler 16 is installed over the upper end of the vertical drive shaft 12 of the potter's wheel, its fixed axis of rotation A is coaxial with the axis of rotation of the vertical drive shaft 12 of the potter's wheel. Thus, when the top plate 14 is supported on the base 20 of drive shaft coupler 16 and secured thereto by the locking arrangement 18, and thereby supported upon the rotary drive shaft 12 of the potter's wheel, the top plate 14 will rotate with the coupler 16 about the latter's axis of rotation A. In view that the top plate 14 can be moved to any one of a multitude of different positions on the base 20, the axis of rotation A does not necessarily have to be aligned with the center of the top plate 14.

Referring to FIGS. 1-3, the locking arrangement 18 is disposed on the underside of the top plate 14. As briefly mentioned earlier, the locking arrangement 18 releasably secures the top plate 14 to the drive shaft coupler 16 and is capable of adjustment to slidably relocate the top plate 14 to the selected one of the multitude of different positions relative to the coupler 16 along orthogonal X-Y coordinates defined by the locking arrangement 18. In relocating the top plate 14 relative to the coupler 16, the axis of rotation A of the top plate 14 is thereby also relocated to a different position relative to the top plate 14 since the axis of rotation A is fixed relative to the coupler 16.

More particularly, the releasable locking arrangement 18 includes a bottom plate 30 of a circular shape and a size substantially the same as the top plate, as can be realized in FIG. 6. The bottom plate 30 has planar top and bottom opposite surfaces 30A, 30B and a central opening 30C. The bottom plate 30 is disposed below and adjacent to the top plate 14 and attached to the top plate 14 by a plurality of threaded fasteners 32 spaced circumferentially from one another. As seen in FIGS. 2 and 3, the coupling sleeve 22 of the drive shaft coupler 16 extends downwardly from the base 20 through the bottom plate opening 30C.

Also, the releasable locking arrangement 18 includes a plurality of guide slots or channels 34, preferably four in number, formed through the bottom plate 30 between the top and bottom surfaces 30A, 30B thereof. The guide channels 34 extend radially outwardly from the central opening 30C of the bottom plate 30 and define the orthogonal X-Y coordinates. One pair of the guide channels 34 are located on the X coordinate axis and the other pair is located on the Y coordinate axis. The locking arrangement 18 further includes a plurality of guide grooves 36 formed in the lower surface 14B of the top plate 14. The guide grooves 36 are aligned with and overlie the respective guide channels 34 formed through the bottom plate 30.

The locking arrangement 18 further includes a plurality of elongated locating members 38 and means 40 for disposing and locking the locating members 38 at selected positions along the respective guide channels 34 and grooves 36. The locating members 38, in the form of elongated solid bars, are mounted in the radial guide channels 34 and grooves 36 of the respective bottom and top plates 30, 14 and are projectable into the central opening 30C of the bottom plate 30. The locating members 38 further are capable of being slidably moved along the radial guide channels 34 and grooves 36, and thus along the orthogonal X-Y coordinates, toward and away from the central opening 30C and into and out of engagement with the coupling sleeve 22 of the drive shaft coupler 16 at angularly displaced locations about the sleeve 22, preferably ninety degrees apart.

The disposing and locking means 40 of the locking arrangement 18 includes a plurality of brackets 42 each placed across a respective one of the guide channels 34 and attached at opposite ends to the bottom surface 30B of the bottom plate 30. Each bracket 42 has a threaded opening 44 aligned with its corresponding guide channel 34. The disposing and locking means 40 also includes a plurality of fasteners 46, such as thumb screws, which are threaded into the threaded openings 44 of the respective brackets 42 for engaging and locking the locating members 38 at a desired position along the guide channels 34 and grooves 36.

When the locating members 38 are released by the locking fasteners 46, the top plate 14 can be slidably moved relative to the upper mounting base 20 of the drive shaft coupler 16. Then, the locating members 38 can be slid independently of one another along the guide channels 34 and grooves 36 to selected positions where they will capture the sleeve 22 of the coupler 14 between them at their inner ends. The inner ends of the locating members 38 project into the space between the annular collar 28 and the mounting base 20 of the coupler 16. Peg-like handles 48 which project downwardly from the locating members 38 can be grasped in order to manually slide the locating members 38 along the guide channels 34 and grooves 36.

Then, by tightening the locking fasteners 46 against the locating members 38, the locating members 38 become locked at the selected positions along the respective guide channels 34 and grooves 36. The top plate 14 has now been relocated to a different position relative to the drive shaft coupler 16 and is now secured to the drive shaft coupler 16 via the locking arrangement 18. The axis of rotation A of the coupler 16 which is also the axis of rotation of the top plate 14 is now also relocated to a new position along the X-Y coordinates relative to the top plate 14.

The top and bottom plates 14, 30 have been disclosed herein as separate components. It is within the understanding of one of ordinary skill in the art and the scope of the present invention that the plates 14, 30, as well as the brackets 42, could be integral-connected components of a one-piece casting.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A wheelhead assembly for use upon a vertical rotary drive shaft of a potter's wheel, said wheelhead assembly comprising:

(a) means defining an upper surface for mounting a mass of clay to be molded into an article of pottery;

(b) a drive shaft coupler having a fixed axis of rotation and supporting said upper surface defining means upon the rotary drive shaft of the potter's wheel for rotation with said coupler about said axis of rotation; and (c) means for releasably securing said upper surface defining means to said drive shaft coupler and for adjustably relocating said upper surface defining means relative to said drive shaft coupler to a selected one of a multitude of different positions along orthogonal X-Y coordinates defined by said securing and relocating means to thereby relocate said axis of rotation of said upper surface defining means relative to said drive shaft coupler to said selected one position along said orthogonal X-Y coordinates;

(d) said drive shaft coupler including an upper mounting base supporting said upper surface defining means and a hollow coupling sleeve attached to said base and extending downwardly therefrom and capable of insertion over and releasable attachment to an upper end of the drive shaft of the potter's wheel;

(e) said upper surface defining means being a top plate and having a lower surface with a centrally-located circular bottom cavity recessed therein, said mounting base of said drive shaft coupler being disposed in said cavity.

2. A wheelhead assembly for use upon a vertical rotary drive shaft of a potter's wheel, said wheelhead assembly comprising:

(a) a top plate having an upper surface for mounting a mass of clay to be molded into an article of pottery;

(b) a drive shaft coupler having a fixed axis of rotation and supporting said top plate upon the rotary drive shaft of the potter's wheel for rotation with said coupler about said axis of rotation; and (c) means for releasably securing said top plate to said drive shaft coupler and for adjustably relocating said top plate relative to said drive shaft coupler to a selected one of a multitude of different positions along orthogonal X-Y coordinates defined by said securing and relocating means to thereby relocate said axis of rotation of said top plate relative to said drive shaft coupler to said selected one position along said orthogonal X-Y coordinates;

(d) said securing and relocating means including a bottom plate having a central opening and being attached, and disposed adjacent, to said top plate, said drive shaft coupler extending through said central opening of said bottom plate.

3. The wheelhead assembly of claim 2 wherein said securing and relocating means includes a plurality of guide channels formed in said bottom plate so as to extend radially outwardly from said central opening of said bottom plate, said guide channels defining said X-Y coordinates.

4. The wheelhead assembly of claim 3 wherein said securing and relocating means includes a plurality of guide grooves formed in said top plate and aligned with and overlying said respective guide channels formed in said bottom plate.

5. The wheelhead assembly of claim 3 wherein said securing and relocating means includes:

a plurality of elongated locating members; and means for mounting said locating members in said radial guide channels of said bottom plate for sliding movement toward and away from said central opening of said bottom plate and into and out of engagement with said drive shaft coupler at angularly displaced locations about said coupler to permit relocation of said top plate and said axis of rotation thereof to said selected one of said different positions relative to said drive shaft coupler.

6. The wheelhead assembly of claim 5 wherein said securing and relocating means includes means for disposing and releasably locking said locating members at said selected one of said multitude of different positions along said respective guide channels.

7. A wheelhead assembly for use upon a vertical rotary drive shaft of a potter's wheel, said wheelhead assembly comprising:

(a) means defining an upper surface for mounting a mass of clay to be molded into an article of pottery;

(b) a drive shaft coupler having an upper mounting base supporting said upper surface defining means and a hollow coupling sleeve attached to said base and extending downwardly therefrom, said sleeve being capable of insertion over and releasably attachment to an upper end of the drive shaft of the potter's wheel, said coupler having a fixed axis of rotation and supporting said upper surface defining means on said top base of said coupler and thereby upon the rotary drive shaft of the potter's wheel for rotation with said coupler about said axis of rotation; and (c) means for releasably securing said upper surface defining means to said drive shaft coupler and for adjustably relocating said upper surface defining means relative to said drive shaft coupler to a selected one of a multitude of different positions along orthogonal X-Y coordinates defined by said securing and relocating means to thereby relocate said axis of rotation of said upper surface defining means relative to said drive shaft coupler to said selected one position along said orthogonal X-Y coordinates;

(d) said upper surface defining means being a top plate and having a lower surface with a centrally-located circular bottom cavity recessed therein, said mounting base of said coupler being disposed in said cavity;

(e) said securing and relocating means including a bottom plate having a central opening and being attached, and disposed adjacent, to said top plate, said coupling sleeve of said drive shaft coupler extending through said central opening of said bottom plate.

8. The wheelhead assembly of claim 7 wherein said securing and relocating means includes a plurality of guide channels formed in said bottom plate so as to extend radially outwardly from said central opening of said bottom plate, said guide channels defining said X-Y coordinates.

9. The wheelhead assembly of claim 8 wherein said securing and relocating means includes a plurality of guide grooves formed in said top plate and aligned with and overlying said respective guide channels formed in said bottom plate.

10. The wheelhead assembly of claim 8 wherein said securing and relocating means includes:

a plurality of elongated locating members; and means for mounting said locating members in said radial guide channels of said bottom plate for sliding movement toward and away from said central opening of said bottom plate and into and out of engagement with said drive shaft coupler at angularly displaced locations about said coupler to permit relocation of said top plate and said axis of rotation thereof to said selected one of said different positions relative to said drive shaft coupler.

11. The wheelhead assembly of claim 10 wherein said securing and relocating means includes means for releasably locking said locating members at said selected one of said multitude of different positions along said respective guide channels.

* * * * *